United States Patent [19]
Rokusek

[11] Patent Number: 5,638,466
[45] Date of Patent: Jun. 10, 1997

[54] METHOD AND APPARATUS FOR DESKEWING IMAGES OF SYMBOLS HAVING A NON-LINEAR BASELINE

[75] Inventor: Chris Rokusek, Ventura, Calif.

[73] Assignee: Horizon Marketing Corporation aka WordWand, Stateline, Nev.

[21] Appl. No.: 497,285

[22] Filed: Aug. 30, 1995

[51] Int. Cl.$^6$ ................................................. G06K 9/36
[52] U.S. Cl. ............................................................ 382/290
[58] Field of Search .............................. 382/177, 200, 382/286, 289, 290, 292, 295, 313

[56] References Cited

U.S. PATENT DOCUMENTS

| | | | |
|---|---|---|---|
| 3,651,462 | 3/1972 | Balm | 340/146.3 H |
| 3,947,817 | 3/1976 | Requa | 340/146.3 MA |
| 3,964,022 | 6/1976 | Martin | 340/146.3 J |
| 3,976,973 | 8/1976 | Martin et al. | 340/146.3 F |
| 4,155,072 | 5/1979 | Kawa | 340/146.3 H |
| 4,158,194 | 6/1979 | McWaters et al. | 340/146.3 SY |
| 4,204,193 | 5/1980 | Schroeder | 340/146.3 H |
| 4,240,748 | 12/1980 | Blane et al. | 356/138 |
| 4,308,523 | 12/1981 | Schapira | 340/146.3 Q |
| 4,926,490 | 5/1990 | Mano | 382/9 |
| 4,931,880 | 6/1990 | Takada | 358/453 |
| 5,054,094 | 10/1991 | Barski | 382/18 |
| 5,054,098 | 10/1991 | Lee | 382/46 |
| 5,111,514 | 5/1992 | Ohta | 382/9 |
| 5,172,422 | 12/1992 | Tan | 382/9 |
| 5,182,450 | 1/1993 | Pan | 250/234 |
| 5,212,376 | 5/1993 | Liang | 250/208.1 |
| 5,212,739 | 5/1993 | Johnson | 382/9 |
| 5,233,168 | 8/1993 | Kulik | 235/456 |
| 5,245,676 | 9/1993 | Spitz | 382/46 |
| 5,247,623 | 9/1993 | Sun | 395/325 |
| 5,301,243 | 4/1994 | Olschafskie et al. | 382/59 |
| 5,321,770 | 6/1994 | Huttenlocher et al. | 382/22 |
| 5,513,277 | 4/1996 | Huttenlocher | 382/171 |

FOREIGN PATENT DOCUMENTS

| | | | |
|---|---|---|---|
| 193866 | 4/1995 | Germany | G06K 9/28 |

OTHER PUBLICATIONS

"The DataPen" User's Guide, Microsoft Windows Version, Primax Electronics Ltd., 1994.

*Primary Examiner*—Andrew Johns
*Attorney, Agent, or Firm*—Michael A. Glenn; Laurie J. Mintz

[57] ABSTRACT

A small hand-held scanner that scans text in a line at a time operates in conjunction with a system that deskews images of symbols having a non-linear baseline to thereby flatten waviness of the baseline associated with such scanning. A program determines a boundary for each of the symbols, including maximum and minimum height and width positions of the symbols. Any of average height, average width, maximum height, maximum width, and average change in height of a bottom of each symbol relative to that of a neighboring symbol is also determined. A threshold is used to delineate between a change of the baseline that is due to random hand movement versus a change in the baseline that is due to a descender, where the descender generates a greater change, and all of the symbols that are to be on the baseline are shifted to a single flat baseline.

28 Claims, 9 Drawing Sheets

METHOD AND APPARATUS FOR DESKEWING IMAGES OF SYMBOLS HAVING A NON-LINEAR BASELINE

BACKGROUND OF THE INVENTION

1. Technical Field

The invention relates to the conversion of images of symbols to an electronic format. More particularly, the invention relates to the deskewing of images of symbols, where the symbols are positioned along a baseline that is not a straight line, but rather is a wavy or a curved line.

2. Description of the Prior Art

Over the past 40 years, the nature of the work force has changed dramatically. The post-industrial era of the later 1950's paved the way for the information era of today. Although the number of manufacturing jobs has steadily decreased, there has been a significant increase in the number of information-related jobs. However, despite the widespread use of computers, a majority of this information still resides on paper. Thus, data in an electronic format still represents only a small percentage of the total amount of information used by most organizations.

Text recognition technology provides a useful tool for converting information stored on paper into an electronic format. Optical character recognition (OCR) technology typically converts the electronic output of a scanner into computer usable files through a series of complex computer algorithms. The electronic image produced by the scanner is comprised of white or black pictures elements referred to as pixels, has a desired resolution, which for text is presently 90,000 pixels per square inch. Each pixel is rendered as a digital value of 1 or 0, which represents either a white pixel or a black pixel. Before optically scanned text is actually recognized, it may be displayed and manipulated as an image on a computer monitor. At this point, the electronic information has not yet been recognized as text, but is merely an image or picture of the text.

OCR algorithms typically recognize scanned text images in two steps. First, they analyze the image of the page to determine which parts of the image are text and numeric data, and determine the structure of the page layout. For example, tables, columns, and paragraphs are identified and located. Next, the characters are examined and identified to produce a file of character data contained in words, including page formatting information, such as tables, columns, paragraphs, spacing, bold characters, italics, and underlining that are necessary to allow manipulation of the data as a text file.

Deskewing is a well understood problem in imaging, especially related to OCR technology. In page scanners, the information that is to be imaged is placed on a flat platen or fed through a set of rollers. In hand held scanners, such as the Omniscan product manufactured by Caere of Los Gatos, Calif., the user pulls the scanner vertically down the page; and the DataPen product manufactured by Primax Electronics of Taiwan, R.O.C., the user pulls the scanner horizontally across the page, typically resulting in a wavy baseline (see, for example U.S. Pat. Nos. 5,182,450 and 5,301,243). In both cases the horizontal baseline of symbols may not be flat across the image, but may slope upwards or downwards at a constant angle. This skew confuses the OCR algorithms, and a deskewing process therefore needs to be implemented to recreate a horizontal baseline. While there are OCR algorithms that are tolerant of skew, the majority and the best of such algorithms are not tolerant of skew.

L. Barski, *Rotationally Impervious Feature Extraction For Optical Character Recognition*, U.S. Pat. No. 5,054,094 (1 Oct. 1991) discloses a method of creating rotationally impervious feature extraction for OCR. Such feature extraction is accomplished through radial intercept feature extraction, counting the number of intercepts for circles of varying radii. This technique is designed to recognize an individual character, but not a line of symbols. Thus, it does not solve the problem of displacement of a sequence of symbols from a straight the baseline.

G. Kulik, *Method of Deskewing An Image*, U.S. Pat. No. 5,233,168 to (3 Aug. 1993) discloses a method for derotating an image by shifting pixels. This is a computationally simple method of derotating an image. However, it does not solve the problem of recognizing a sequence of symbols that is positioned along a wavy baseline.

Y. Lee, *Method of Detecting The Skew Angle Of A Printed Business Form*, U.S. Pat. No. 5,054,098 (1 Oct. 1991) discloses a process in which samples are taken to measure skew, and from which samples a histogram is created. The most frequently occurring skew angle is considered the skew angle for the entire document. The baseline in this technique is assumed to be a straight line.

A. L. Spitz, *Determination Of Image Skew Angle From Data Including Data In Compressed Form*, U.S. Pat. No. 5,245,676 (14 Sep. 1993) discloses a method of determining an image skew angle. The problem solved is one of having a baseline with a fixed angle. The method used is to select certain features on the image on which to base a skew angle and assign weights to those features.

In all of the above patents, there is a single skew angle constant for the entire image or at least the entire line of text. These patents do not attempt to deskew an image comprising a sequences of characters positioned along a wavy baseline.

It is desirable to produce a hand-held scanner that is able to scan text one line at a time, e.g. as a scanning wand or pen. The user would hold such scanner as with a pen and draw the scanner horizontally across the page to enter information into a computer one line at a time, much like a highlighting pen is used to highlight text. Such scanner scans symbols one line at a time. Because of this manual horizontal action, the image created by the scanner is not distorted or skewed in the conventional manner, where the skew is of a constant angle, but is subject to a new problem, referred to herein as baseline waviness.

The baseline waviness is created because there is no flat baseline of symbols, or even a straight, but angled baseline, when hand scanning across a page. Thus, the baseline assumes a wavy profile.

As discussed above, presently known deskewing techniques do not attempt to flatten the waviness of the baseline. Therefore, OCR cannot accurately read information scanned by such devices. Unfortunately, hand held scanners, especially scanning pens, cannot be considered sufficiently reliable for large scale adoption in the information industry until such problems as the wavy baseline produced by hand scanning are resolved.

SUMMARY OF THE INVENTION

The invention is used in conjunction with a small hand-held scanner that scans horizontally across the page one line at a time. The invention provides a system that deskews images of symbols having a non-linear baseline to thereby flatten waviness associated with such scanning, and thus allows OCR to recognize symbols so scanned. The system operates in accordance with a program that determines a boundary for each of the symbols, including maximum and minimum height and width positions of said symbols. Any of average height, average width, maximum height, maximum width, and average change in height of a bottom of each symbol relative to that of a neighboring symbol is also determined. A threshold is used to delineate between a change of the baseline that is due to random hand movement versus a change in the baseline that is due to a descender, where the descender generates a greater change, and all of the symbols that are to be on the baseline are shifted to a single flat baseline.

DETAILED DESCRIPTION OF THE INVENTION

Figure 1:
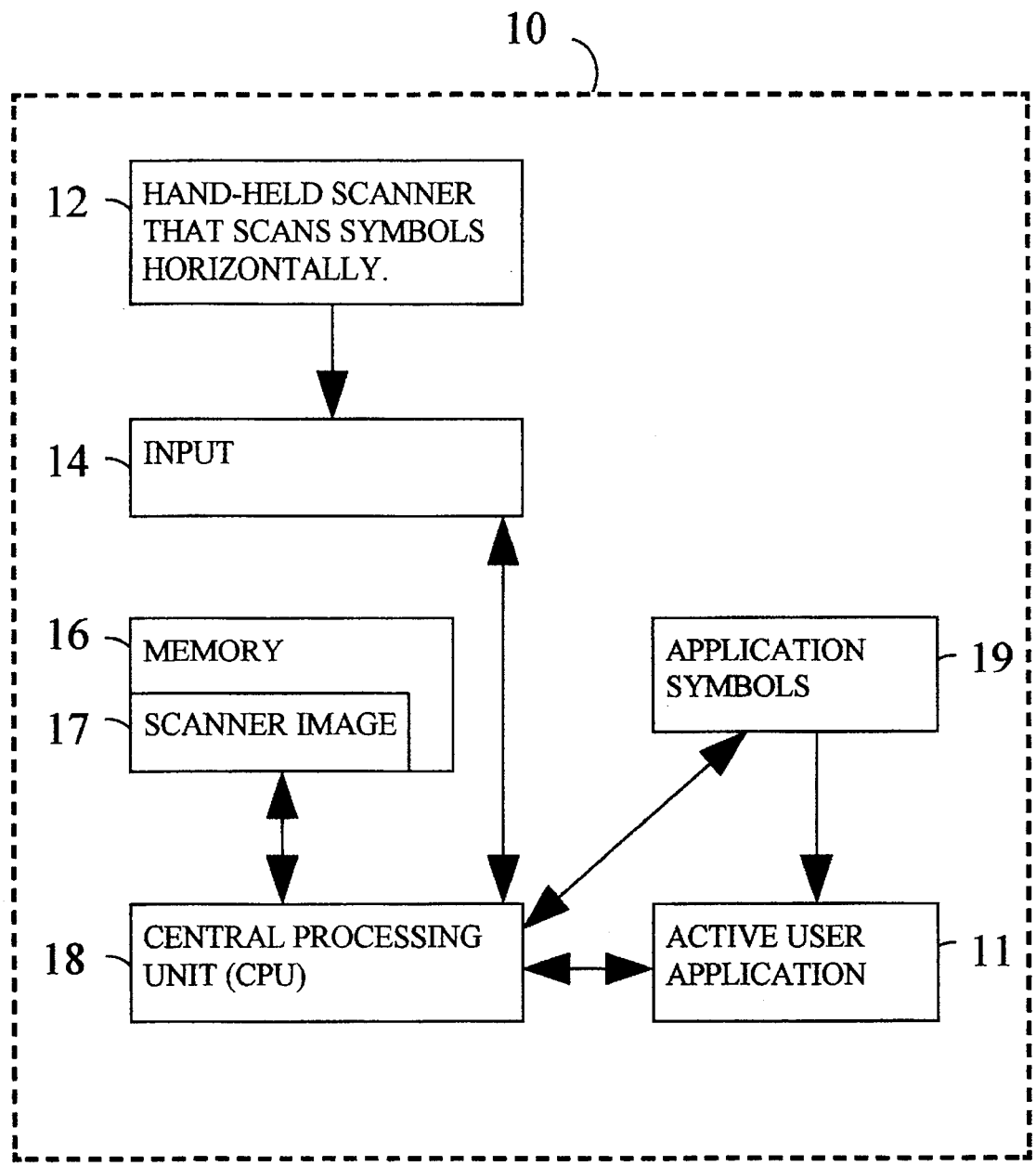
FIG. 1 is a block schematic diagram of a system that incorporates a scanner and a computer according to the invention.

FIG. 1 is a block schematic diagram of a system 10 that incorporates a scanner and a computer according to the invention. A hand-held scanner 12 is preferably used to scan horizontally across a line of symbols. The scanner is linked to the input port 14 of a computer. The input function is managed by a CPU 18. Image information 17 obtained by the scanner is stored by the CPU in a memory 16. The invention provides an application 19 that processes the image stored in memory, and that then sends a stream of recognized text-based symbols to an active user application 11, such as a word processor, database, or spreadsheet application.

Figure 2:
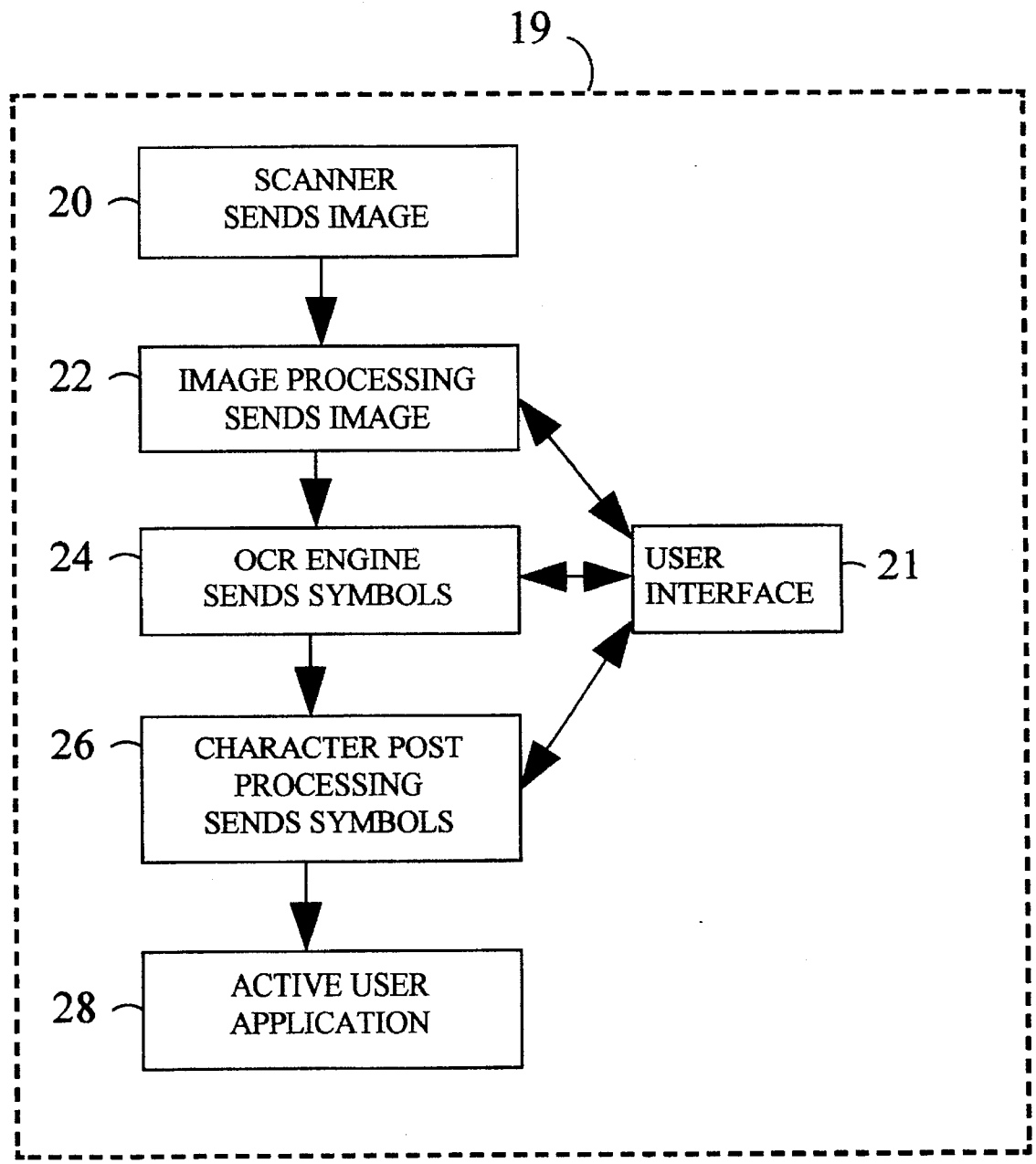
FIG. 2 shows a block schematic diagram of an image to character translation application for use with a hand-held scanner according to the invention.

FIG. 2 shows a block schematic diagram of an image to character translation application for use with a hand-held scanner according to the invention. The deskewing application consists of a user Interface 21 that allows the user to change various settings and links to the other parts of the application. The invention processes an image that is created by a hand-held scanner 20 in an image processing module 22 to create an image that is deskewed and that consists of a single line of symbols, such as text. This image is passed to an OCR engine 24 which recognizes the symbols. Such recognized symbols are then sent to a character post processing module 26, where they are optionally modified and then sent to an active user application 28.

Figures 3A, 3B:
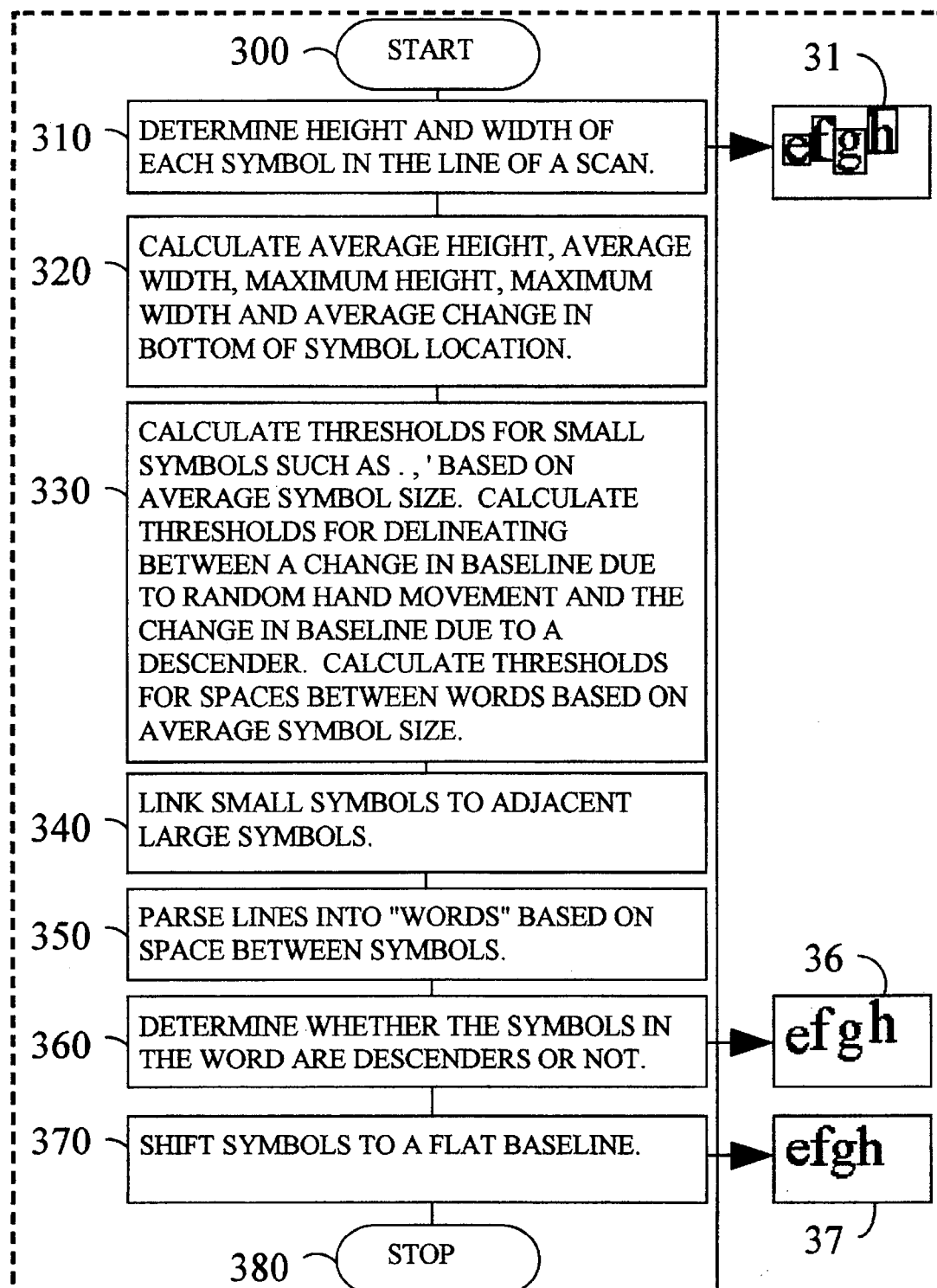
FIG. 3A is a simplified flow chart depicting image processing according to the invention.
FIG. 3B is an example of a processed image at various stages of image processing in accordance with the image processing sequence of FIG. 3A.

FIG. 3A is a simplified flow chart depicting image processing according to the invention; and FIG. 3B is an example of a processed image at various stages of image processing in accordance with the image processing sequence of FIG. 3A. Image processing begins (300), and the system first determines the maximum and minimum height position and width position of each symbol in the scan (310). The corresponding image 31 is shown graphically in FIG. 3B, where a rectangle surrounds each symbol. The bottom of the rectangle marks the lowest point on the symbol; the top of the rectangle marks the highest point on the symbol; the left side of the rectangle marks the left most point of the symbol; and the right side of the rectangle marks the right most point of the rectangle.

After determining the bounds for each symbol, the system calculates various statistics about the set of symbols (320), including average height, average width, maximum height, maximum width, and the average change in height of the bottom of each symbol relative to that of its neighbor. From these calculations, the system calculates the threshold for small symbols, such as', (330), which are based on average symbol width and height. The system also calculates the threshold for spaces between sets of spaced symbols, also referred to herein as words, based on average symbol width; and a threshold is calculated to delineate between a change of baseline due to random hand movement versus a change in baseline due to a descender, where the descender generates a greater change. These small symbols are linked to adjacent symbols (340), so they are not unreasonably forced to the baseline.

The system then breaks the line of text into collections of symbols, referred to as words (350). These need not be words as one normally define them, but merely represent groups of symbols without large spaces between them. The system then determines which symbols are descenders, i.e. below baseline, and which symbols are not, i.e. on baseline (360). This is shown in the corresponding image 36 on FIG. 3B. Finally, the system shifts all the symbols that are to be on baseline to a single flat baseline and shifts those symbols that are below baseline in an amount proportional to how much their adjacent symbols moved (370). This is shown in the corresponding image 37 on FIG. 3B. Thereafter, image processing is complete (380).

Figures 4A, 4B:
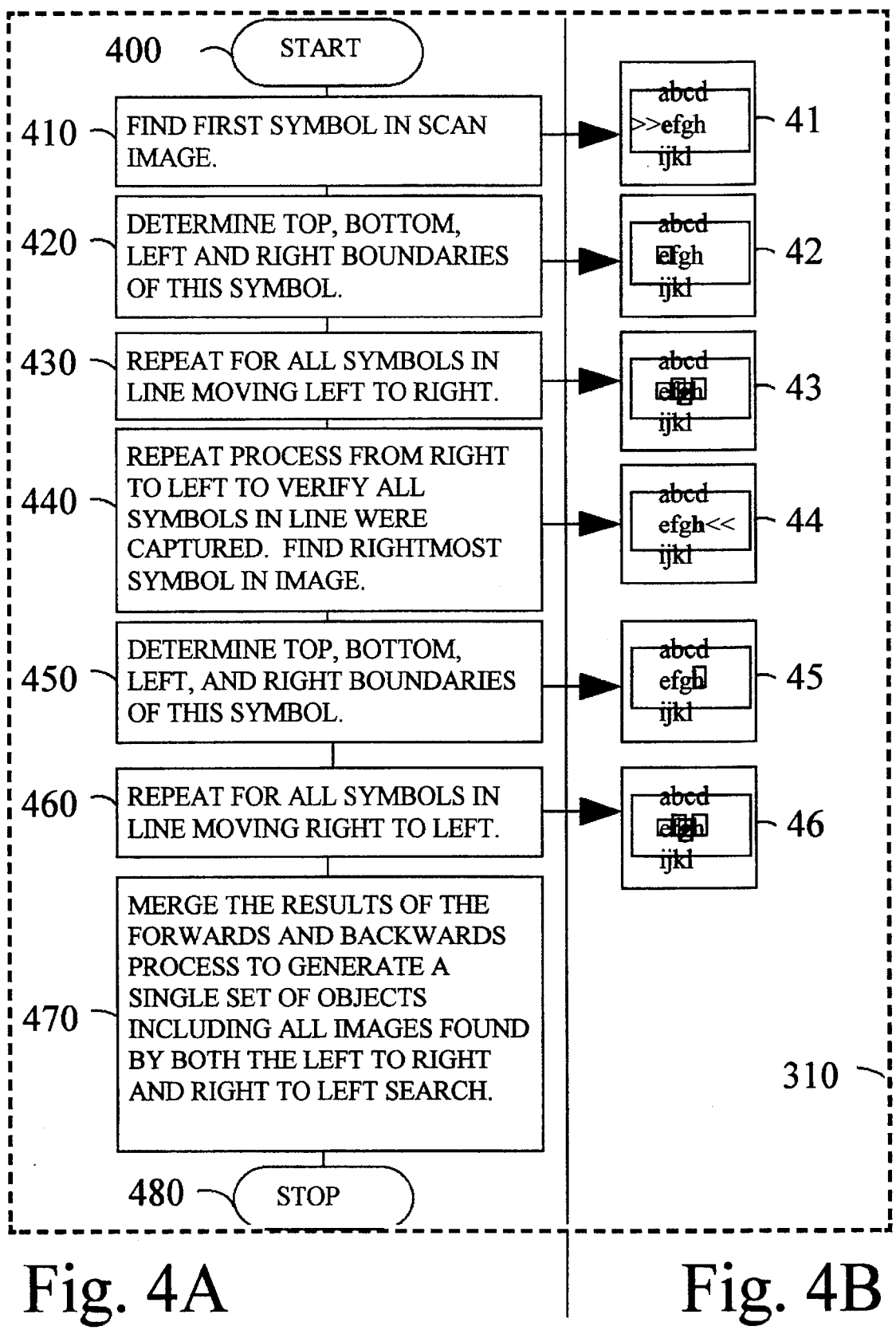
FIG. 4A is a flow chart depicting a method for finding symbols and symbol height and width during a scan operation according to the invention.
FIG. 4B is an example of a processed image at various stages of image processing in accordance with the image processing sequence of FIG. 4A.

FIG. 4A is a flow chart depicting a method for finding symbols and symbol height and width during a scan operation (as identified by the numeric designator 310 on FIG. 3A) according to the invention; and FIG. 4B is an example of a processed image at various stages of image processing in accordance with the image processing sequence of FIG. 4A. The system starts processing (400) and finds the first symbol in the scan image (410) by approaching the image from the left looking for dark pixels (in the case of dark type on a light background; for light type on a dark background, the system looks for light pixels), searching further to the right and further away from the center of the vertical range of the image until a dark pixel is found. The scanned image is shown for purposes of example on FIG. 4B as an image 41 in the form of a rectangle in which various symbols reside. When a dark pixel is found, the system determines the top, bottom, left and right boundaries of the symbol (420) of which the pixel is a member (as represented by the image 42 on FIG. 4B). This step is repeated (430), moving to the right, until all symbols have been so processed (as represented by the image 43 on FIG. 4B). This step is repeated from right to left to verify that all symbols were discovered (440; as represented by the image 44 on FIG. 4B).

The system next determines the top, bottom, left, and right boundaries of the rightmost symbol (450; as represented by the image 45 on FIG. 4B). This step is repeated (460) for all symbols in line, moving right to left, as shown by the image 46 on FIG. 4B.

The system merges the results of the two foregoing processes to ensure that all symbols have been included (470) and the process is completed (480).

Figure 5A:
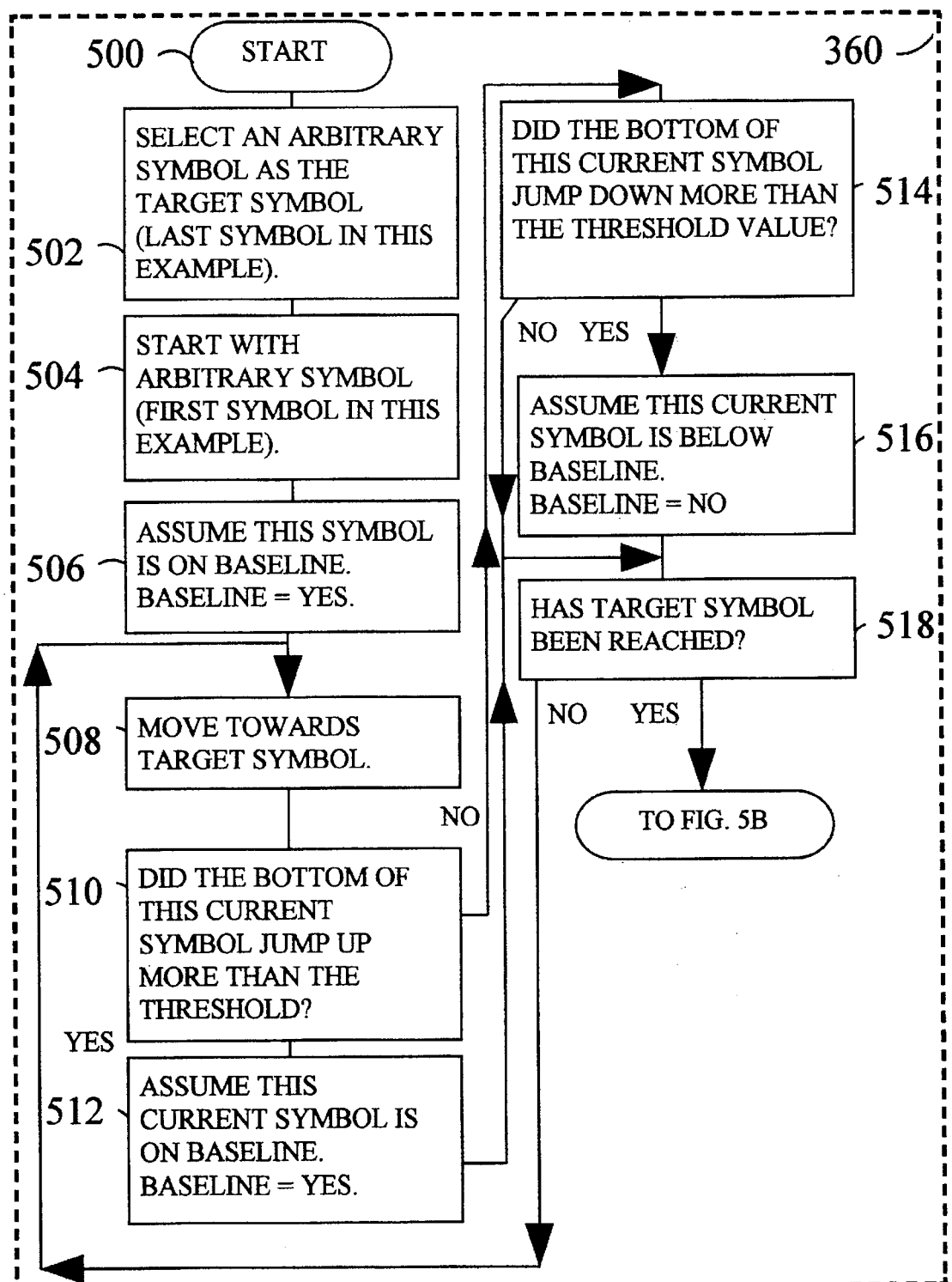
FIGS. 5A and 5B provide a flow chart depicting a process for determining whether a given symbol is a descender or not according to the invention.
Figure 5B:
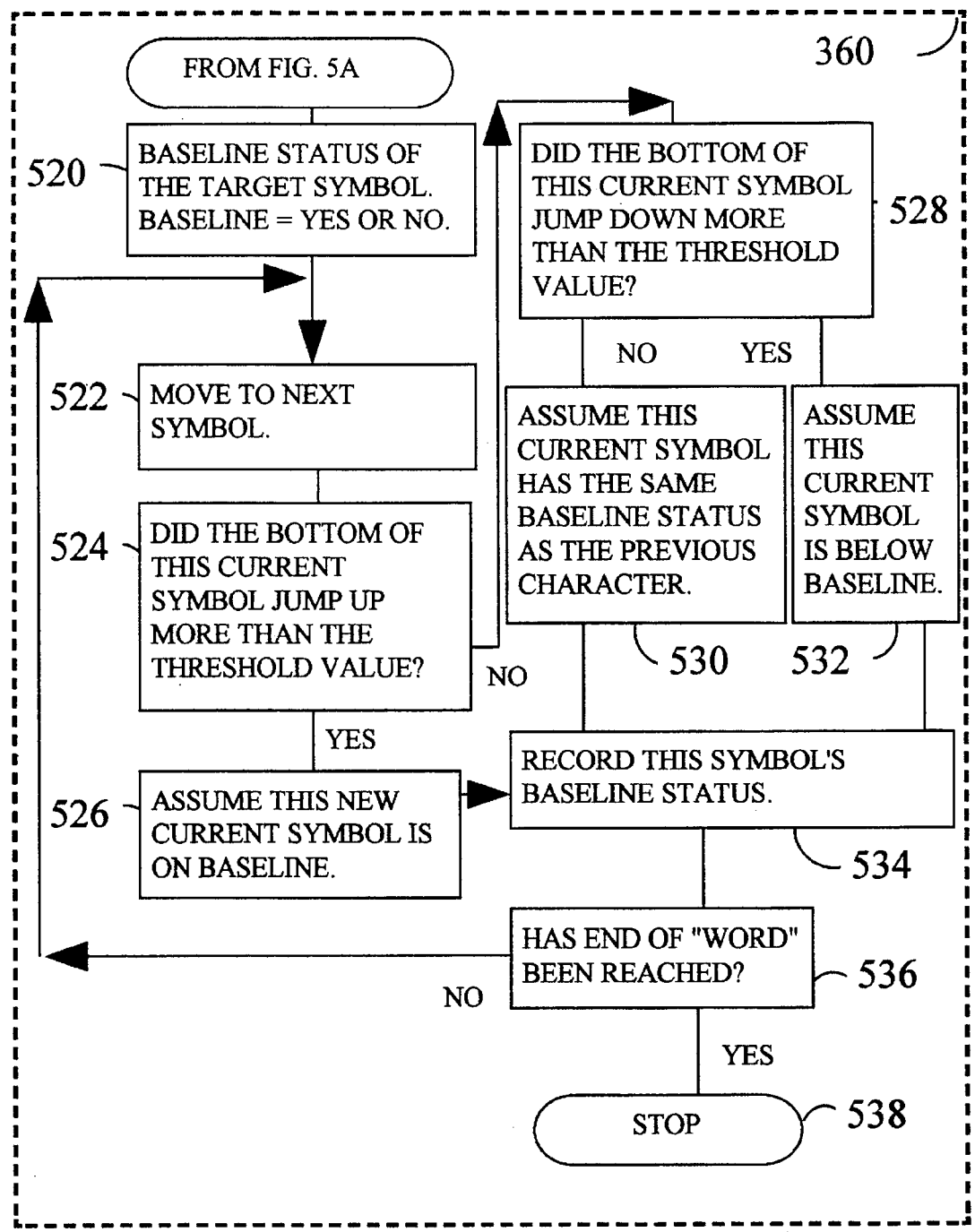

FIGS. 5A and 5B provide a flow chart depicting a process for determining whether a given symbol is a descender or not according to the invention. FIG. 5A provides a flow chart determining whether the target symbol is on baseline (the process step identified by the numeric designator 360 on FIG. 3A). In the preferred embodiment of the invention, the process begins (500) and the last symbol in the word is selected as the target symbol from which the status of the other symbols in the word is determined (502).

In the preferred embodiment of the invention, actual symbol processing starts with the first symbol in the word (504). The system then determines if the last symbol is on baseline or not. The system uses a voting scheme, starting with the first symbol in the word. Because most symbols are on baseline, it is assumed that the symbol is on baseline (506). The system moves toward the target symbol (508) and determines if the bottom of the current symbol jumps up more than a threshold amount (510) as calculated (330). Every time the system jumps down to a greater extent than threshold (514), it is assumed that the symbol is below baseline (516). Every time the bottom of the current symbol jumps up to a greater extent than threshold, it is assumed that the target symbol is on baseline (512). If there is no change greater than threshold, the baseline status remains the same. When the end of the word is reached (518), it is fairly clear whether the target symbol is on baseline or not.

FIG. 5B provides a flow chart determining whether the other symbols in the word are on baseline or not, once the status of the target symbol status is determined. In the preferred embodiment of the invention, the baseline status is set (520) and the system moves from the end of the current word to the beginning of that word (522). Moving to the next to last symbol, if the bottom of this present symbol jumped up relative to the bottom of the previous symbol more than the threshold value (524), then it is assumed that the present symbol is on baseline (526). If the bottom of the present symbol jumped down relative to the bottom of the previous symbol more than threshold value (528), then it is assumed that the present symbol is below baseline (532). If there is no change of baseline greater than the threshold, it is assumed that any change in the baseline is due to the waviness of the baseline and the present symbol is assigned the same baseline status as assigned to the previous symbol (530; 534). The system repeats this process on adjacent symbols until all symbols in the word (536) have been processed, and the process is then complete (538).

Figure 6:
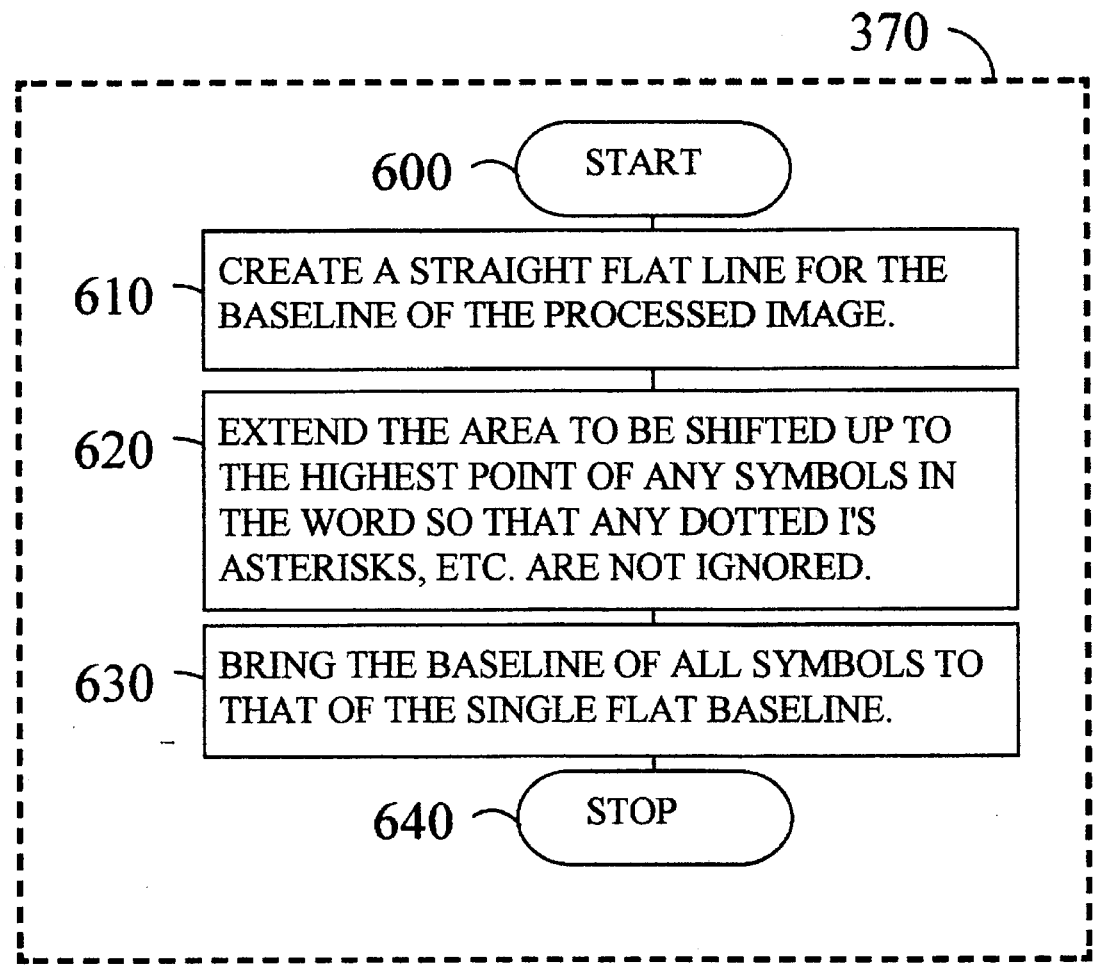
FIG. 6 is a flow chart depicting a method for shifting symbols onto a flat baseline according to the invention.

FIG. 6 is a flow chart depicting a method for shifting symbols onto a flat baseline according to the invention (as shown by the process step identified by the numeric designator 370 on FIG. 3A). The process begins (600), and a horizontal line is created (610), such that the system reassigns the baseline of the processed image. The system then extends the shifted area up to the top of the tallest symbol and down to bottom of the lowest symbol (620), and all symbols are realigned to a new flat baseline (630). Thereafter, the process is completed (640).

Figures 7A, 7B:
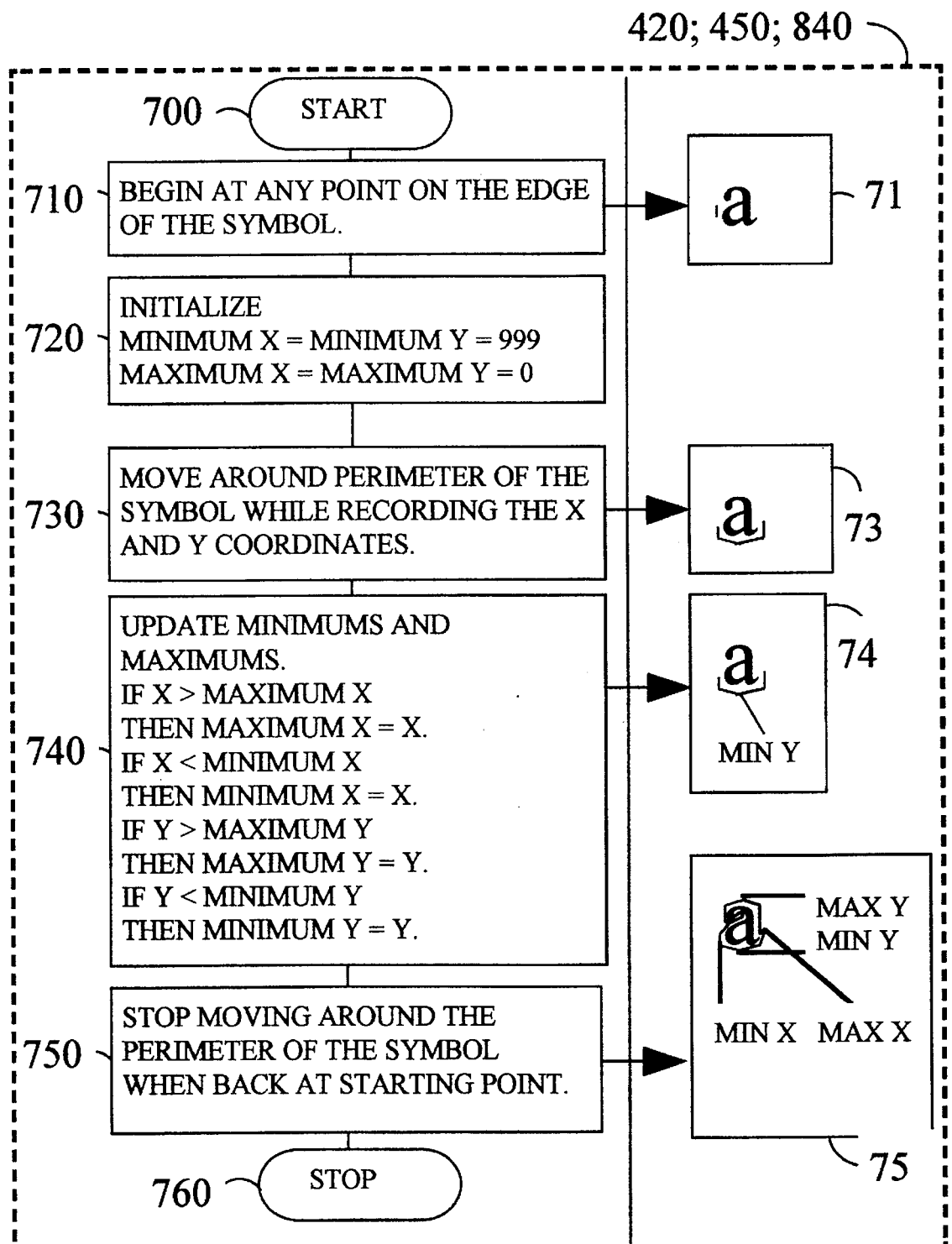
FIG. 7A is a flow chart depicting a method for determining symbol boundaries according to the invention.
FIG. 7B is an example of a processed image at various stages of image processing in accordance with the image processing sequence of FIG. 7A.

FIG. 7A is a flow chart depicting a method for determining symbol boundaries according to the invention (as shown by the steps identified by numeric designators 420 and 450 on FIG. 4A); and FIG. 7B is an example of a processed image at various stages of image processing in accordance with the image processing sequence of FIG. 7A. When the process starts (700), processing begins at an arbitrary point on the symbol (710; as shown by the symbol image 71 on FIG. 7B), the system is initialized (720), and processing then moves around the border of the symbol in a constant direction (730; as shown by the symbol image 73 on FIG. 7B). The system monitors the x and y coordinates as the process moves around a symbol and updates coordinate minimums and maximums (740) as follows (see, also the symbol image 74 on FIG. 7B):

When x is greater than maximum x, update maximum x to the value of x;

When y is greater than maximum y, update maximum y to the value of y;

When x is less than minimum x, update minimum x to the value of x; and

When y is less than minimum y, update minimum y to the value of y.

This process is complete when there has been a complete circuit of the symbol (750; see the symbol image 75 on FIG. 7B), and the process then stops (760).

Figures 8A, 8B:
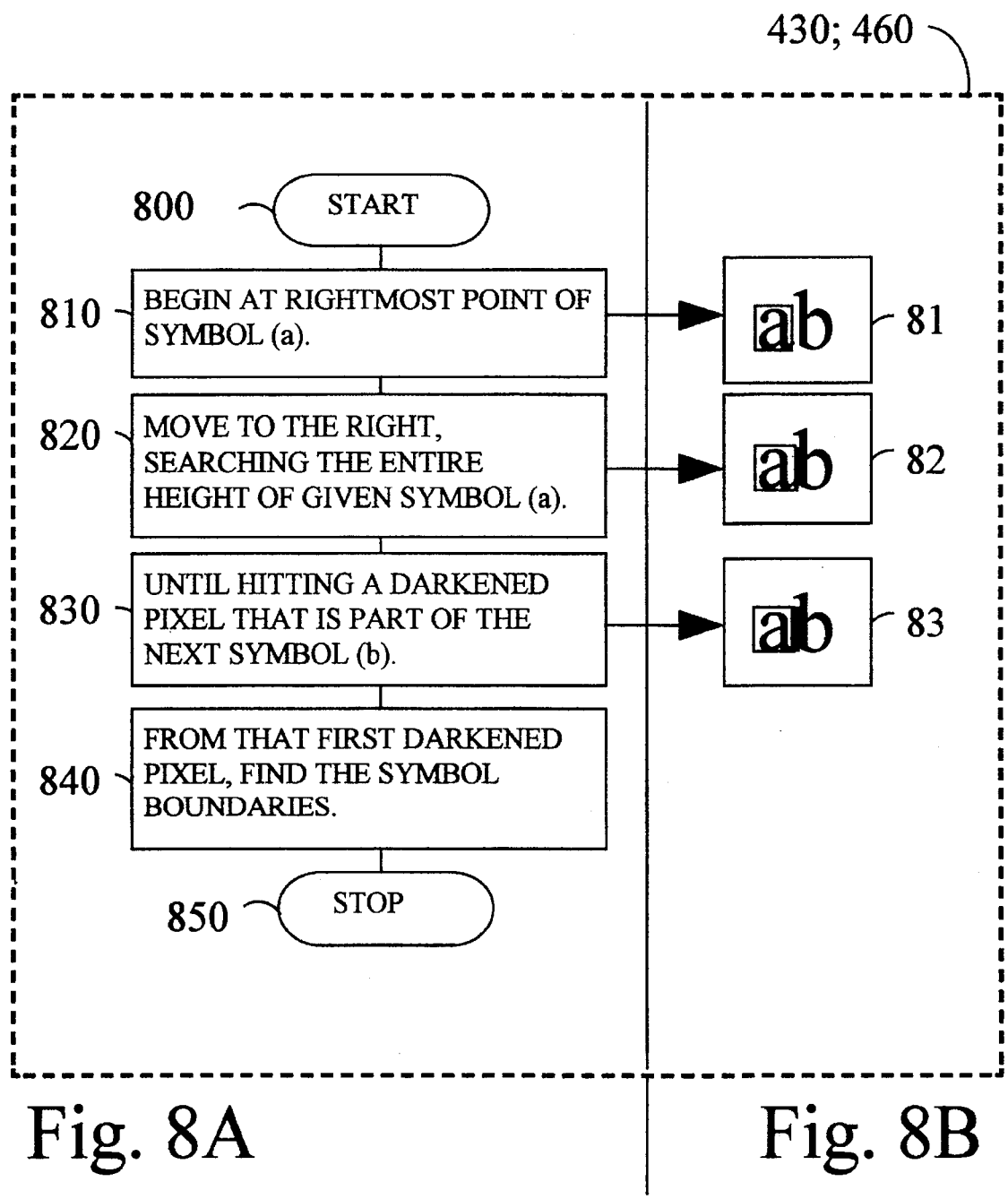
FIG. 8A is a flow chart depicting a method for finding the next symbol to the right according to the invention.
FIG. 8B is an example of a processed image at various stages of image processing in accordance with the image processing sequence of FIG. 8A.

FIG. 8A is a flow chart depicting a method for finding the next symbol to the right according to the invention (which is represented by process step 430; and by process step 460, which is analogous, although not identical to process step 430, both of which process steps appear on FIG. 4A); and FIG. 8B is an example of a processed image at various stages of image processing in accordance with the image processing sequence of FIG. 8A. The process starts (800), and processing begins (810) at the right border of the previous symbol (as represented by the letter "a" in the symbol image 81 shown on FIG. 8B). The system moves up and down the range of heights in the previous symbol (820; as represented by the symbol image 82 on FIG. 8B), shifting one pixel to the right until a dark pixel is hit (830; as represented by the symbol image 83 on FIG. 8B). It is assumed that that pixel is part of another symbol. Thus, the first darkened pixel is used to find the symbol boundaries (840) and the process is complete (850).

Although the invention is described herein with reference to the preferred embodiment, one skilled in the art will readily appreciate that other applications may be substituted for those set forth herein without departing from the spirit and scope of the invention. For example, instead of merely shifting the symbols vertically, it may be preferred to both shift the symbols, and twist the symbols based upon the angle formed with the symbol and its predecessor. It is also possible to use a symbol other than the last symbol of a word as the target symbol, and start with a symbol in the voting scheme other than the first symbol. It is also possible to use a digital filter to remove the waviness of the baseline by feeding the values of the bottoms of each symbol to the filter. Accordingly, the invention should only be limited by the claims included below.

I claim:

1. A method for deskewing images of scanned symbols on a baseline that is not a straight line comprising the steps of:
   determining a boundary for each of said symbols, including maximum and minimum height and width positions of said symbols;

determining for said symbols any of average height, average width, maximum height, maximum width, and average change in height of a bottom of each symbol relative to that of a neighboring symbol;

determining a threshold that is used to delineate between a change of said baseline due to random movement versus a change in said baseline due to a descender, where said descender generates a greater change;

determining which symbols descend below a baseline and which symbols are on said baseline;

shifting all of said symbols that are to be on said baseline to a single flat baseline; and shifting all of said symbols that are below said baseline in an amount proportional to that by which adjacent symbols are shifted.

2. The method of claim 1, further comprising the steps of:

determining a threshold for small symbols, based on an average symbol width and height; and linking said small symbols to adjacent symbols.

3. The method of claim 1, further comprising the steps of:

determining a threshold for spaces between spaced sets of symbols based on an average symbol width; and breaking a line of text into groups of symbols that do not have large spaces between them.

4. The method of claim 1, wherein said step of determining symbol bounds further comprises the steps of:

finding a target symbol by approaching said image from a left side of said symbol and by looking for dark pixels;

searching toward a right side of said target symbol and further away from a center of a vertical range of said image until a dark pixel is found;

determining a top, bottom, left, and right boundary of said target symbol of which said dark pixel is a member;

repeating said boundary determining step until all of said symbols have been so processed and repeating this step from right to left to verify that all symbols were discovered;

determining a top, bottom, left, and right boundary of a rightmost symbol;

repeating said rightmost symbol determining step for all of said symbols; and merging results of said foregoing steps to ensure that all of said symbols have been processed.

5. The method of claim 4, further comprising the steps of:

determining whether said target symbol is on said baseline.

6. The method of claim 5, said step of determining whether said target symbol is on said baseline further comprising the steps of:

selecting a last symbol in a symbol sequence as said target symbol from which the status of the other symbols in the word is determined;

beginning symbol processing with the first symbol in said symbol sequence;

determining if a last symbol is on said baseline or not by use of a voting scheme, starting with a first symbol in said symbol sequence, where it is assumed that said first symbol is on said baseline;

moving toward said target symbol;

determining if a bottom of a current symbol jumps up more than said threshold;

assuming that said target symbol is below baseline if said bottom of said current symbol jumps down relative to a bottom of a previous symbol by more than said threshold value;

assuming that said target symbol is on baseline every time said bottom of said current symbol jumps up to a greater extent than said threshold; and maintaining baseline status if there is no change greater than said threshold.

7. The method of claim 6, further comprising the step of:

starting with a symbol in said voting scheme other than said first symbol.

8. The method of claim 5, further comprising the step of:

determining whether other symbols in a symbol sequence are on said baseline or not, once status of said target symbol status is determined.

9. The method of claim 8, further comprising the steps of:

setting a baseline status;

moving from an end of a current symbol sequence to a beginning of a next symbol sequence;

moving to a next to last symbol;

assuming that said current symbol is on said baseline if the bottom of said present symbol jumped up relative to the bottom of a previous symbol by more than said threshold value;

assuming that said current symbol is below said baseline if the bottom of said current symbol jumped down relative to the bottom of said previous symbol by more than threshold value;

assuming that any change in said baseline is due to waviness of the baseline if there is no change of said baseline greater than said threshold, wherein a same baseline status is assigned to said current symbol as that assigned to said previous symbol; and repeating the previous steps on adjacent symbols until all symbols in said symbol sequence have been processed.

10. The method of claim 4, wherein said step of finding a next symbol to the right further comprises the steps of:

beginning at a right border of a previous symbol; and moving up and down a range of heights in said previous symbol, shifting one pixel right until dark pixel is hit, where it is assumed that said dark pixel is part of another symbol.

11. The method of claim 4, further comprising the step of:

using a symbol other than said last symbol of said symbol sequence as said target symbol.

12. The method of claim 1, said step of shifting said symbols further comprises the steps of:

creating a horizontal line to which said symbols may be realigned;

extending a shifted area up to a top of a tallest of said symbols and down to a bottom of a lowest of said symbol; and realigning all of said symbols to a new flat baseline.

13. The process of claim 1, said step of determining symbol boundaries further comprises the steps of:

starting processing at an arbitrary point on one of said symbols;

moving around a border of said symbol in a constant direction until a complete circuit of said symbol is made;

monitoring x and y coordinates while around said symbol; and updating coordinate minimums and maximums as follows:

when x is greater than maximum x, update maximum x to the value of x;

when y is greater than maximum y, update maximum y to the value of y;

when x is less than minimum x, update minimum x to the value of x; and when y is less than minimum y, update minimum y to the value of y.

14. The method of claim 1, further comprising the step of:

shifting said symbols vertically.

15. The method of claim 1, further comprising the step of:

both shifting said symbols, and twisting said symbols, based upon an angle formed with said symbol and a predecessor symbol.

16. An apparatus for deskewing images of scanned symbols on a baseline that is not a straight line comprising:

means for determining a boundary for each of said symbols, including maximum and minimum height and width positions of said symbols;

means for determining for said symbols any of average height, average width, maximum height, maximum width, and average change in height of a bottom of each symbol relative to that of a neighboring symbol;

means for determining a threshold that is used to delineate between a change of said baseline due to random hand movement versus a change in said baseline due to a descender, where said descender generates a greater change;

means for determining which symbols descend below a baseline and which symbols are on said baseline;

means for shifting all of said symbols that are to be on said baseline to a single flat baseline and means for shifting all of said symbols that are below said baseline in an amount proportional to that by which adjacent symbols are shifted.

17. The apparatus of claim 16, further comprising:

means for determining a threshold for small symbols, based on an average symbol width and height; and means for linking said small symbols to adjacent symbols.

18. The apparatus of claim 16, further comprising:

means for determining a threshold for spaces between spaced sets of symbols based on an average symbol width; and means for breaking a line of text into groups of symbols that do not have large spaces between them.

19. The apparatus of claim 16, wherein said means for determining symbol bounds further comprises:

means for finding a target symbol by approaching said image from a left side of said symbol and by looking for dark pixels;

means for searching toward a right side of said target symbol and further away from a center of a vertical range of said image until a dark pixel is found;

means for determining a top, bottom, left, and right boundary of said target symbol of which said dark pixel is a member;

means for repeating said boundary determining step until all of said symbols have been so processed and repeating this step from right to left verify that all symbols were discovered;

means for determining a top, bottom, left, and right boundary of a rightmost symbol;

means for repeating said rightmost symbol determining step for all of said symbols; and means for merging results of said foregoing steps to ensure that all of said symbols have been processed.

20. The apparatus of claim 19, further comprising:

means for determining whether said target symbol is on said baseline, said means for determining whether said target symbol is on said baseline comprising:

means for selecting a last symbol in a symbol sequence as said target symbol from which the status of the other symbols in the word is determined;

means for beginning symbol processing with the first symbol in said symbol sequence;

means for determining if a last symbol is on said baseline or not by use of a voting scheme, starting with a first symbol in said symbol sequence, where it is assumed that said first symbol is on said baseline;

means for moving toward said target symbol;

means for determining if a bottom of a current symbol jumps up more than said threshold amount, wherein it is assumed that said target symbol is below baseline if said bottom of said current symbol jumps down relative to a bottom of a previous symbol by more than said threshold value, and it is assumed that said target symbol is on baseline every time said bottom of said current symbol jumps up to a greater extent than said threshold; and means for maintaining said baseline if there is no change greater than said threshold.

21. The apparatus of claim 20, further comprising:

means for determining whether other symbols in a symbol sequence are on said baseline or not, once status of said target symbol status is determined, comprising:

means for setting a baseline status;

means for moving from an end of a current symbol sequence to a beginning of said symbol sequence;

means for moving to a next to last symbol, wherein it is assumed that said current symbol is on said baseline if the bottom of said present symbol jumped up relative to the bottom of a previous symbol by more than said threshold value, it is assumed that said current symbol is below said baseline if the bottom of said current symbol jumped down relative to the bottom of said previous symbol by more than threshold value, and it is assumed that any change in said baseline is due to waviness of the baseline if there is no change of said baseline greater than said threshold, wherein a same baseline status is assigned to said current symbol as that assigned to said previous symbol; and means for repeating the previous steps on adjacent symbols until all symbols in said symbol sequence have been processed.

22. The apparatus of claim 20, further comprising:

means for starting with a symbol in said voting scheme other than said first symbol.

23. The apparatus of claim 19, wherein said means for finding a next symbol to the right further comprises:

means for beginning at a right border of a previous symbol; and means for moving up and down a range of heights in said previous symbol, shifting one pixel right until a dark pixel is hit, where it is assumed that said dark pixel is part of another symbol.

24. The apparatus of claim 19, further comprising:

means for using a symbol other than said last symbol of said symbol sequence as said target symbol.

25. The apparatus of claim 16, said means for shifting said symbols further comprises:

means for creating a horizontal line to which said symbols may be realigned;

means for extending a shifted area up to a top of a tallest of said symbols and down to a bottom of a lowest of said symbol; and means for realigning all of said symbols to a new flat baseline.

26. The apparatus of claim 16, said means for determining symbol boundaries further comprises:

means for starting processing at an arbitrary point on one of said symbols;

means for moving around a border of said symbol in a constant direction until a complete circuit of said symbol is made;

means for monitoring x and y coordinates while around said symbol; and means for updating coordinate minimums and maximums as follows:

when x is greater than maximum x, update maximum x to the value of x;

when y is greater that maximum y, update maximum y to the value of y;

when x is less than minimum x, update minimum x to the value of x; and when y is less than minimum y, update minimum y to the value of y.

27. The apparatus of claim 16, further comprising:

means for shifting said symobls vertically.

28. The apparatus of claim 16, further comprising:

means for both shifting said symbols, and twisting said symbols, based upon an angle formed with said symbol and a predecessor symbol.

* * * * *